United States Patent [19]

Miller

[11] 4,362,026

[45] Dec. 7, 1982

[54] ENTHALPY CONTROL

[76] Inventor: Lloyd W. Miller, 610 Carver Beach Rd., Chanhassen, Minn. 55317

[21] Appl. No.: 201,326

[22] Filed: Oct. 27, 1980

[51] Int. Cl.³ .............................................. F25B 29/00
[52] U.S. Cl. .................................... 62/176 E; 62/180; 165/16
[58] Field of Search .................. 62/180, 332, 410-412, 62/176 E, 231; 165/16, 12; 236/49, 46 R

[56] References Cited

U.S. PATENT DOCUMENTS

| | | | |
|---|---|---|---|
| 2,206,445 | 7/1940 | Beeler | 165/16 X |
| 2,209,787 | 7/1940 | Miller | 236/1 R |
| 3,139,020 | 6/1964 | Schemenauer | 165/16 X |
| 3,915,376 | 10/1975 | Attridge, Jr. et al. | 236/44 C |
| 3,949,607 | 4/1976 | Nodolf | 73/336 |
| 3,979,922 | 9/1976 | Shavit | 62/97 |
| 4,023,947 | 5/1977 | Ferry | 62/180 |
| 4,069,030 | 1/1978 | Nickell et al. | 62/176 C |
| 4,175,401 | 11/1979 | McManus | 62/180 |
| 4,186,564 | 2/1980 | Myers | 165/16 X |

OTHER PUBLICATIONS

Honeywell, Enthalpy Control H205A, 4/1977.

Primary Examiner—William Wayner
Attorney, Agent, or Firm—Merchant, Gould, SMith, Edell, Welter & Schmidt

[57] ABSTRACT

An air conditioning system in which system operation is interrupted when the space to be conditioned is unoccupied: when the outside air is of sufficiently low enthalpy the system cooler and damper controls are disabled and outside air is used for cooling, unless its enthalpy or temperature is indeed too low, when normal system operation is reestablished.

3 Claims, 4 Drawing Figures

ENTHALPY CONTROL

This invention relates to the field of heating, ventilating, and cooling equipment for installations where a space is to be air-conditioned by the flow of air produced by a single large fan unit.

BACKGROUND OF THE PRIOR ART

A typical heating, ventilating and air conditioning installation includes a heater for winter use, an air conditioner or cooler for summer use, a fan for drawing air across heater and cooler and discharging it to the space to be conditioned, a "return" air inlet from the space to be conditioned, an "outside" air inlet from the ambient atmosphere, a plenum for receiving air from the inlets, mixing it, and delivering it to the cooler, dampers in the inlets, means responsive to the temperature of the mixed air in the plenum for controlling the dampers to vary the ratio of outside to return air in the mixture, and means for venting the space to the atmosphere to prevent undesired pressure build-up within the space.

During the winter the temperature of the air discharged into the space from the installation is controlled by varying the proportions of outside, or cooler, air to return air, thermal input from the heater and fan operation being uniform. During the summer the temperature of the discharge is controlled in the same manner, except that the uniform thermal input is negative, from the cooler.

In the summer cycle it is customary to set the cooler in operation on the first warm day, and to leave the system in operation continuously for the entire season. The energy consumption for this form of operation is very considerable, and maximum wear of the cooling equipment is also inherent. There are, however, many occasions, particularly in the spring and fall, and often on summer mornings as well, when the outside air is at a sufficiently low temperature to supply all the cooling needed, so that the cost and energy drain of operating the cooler could be dispensed with. The situation is, of course, complicated by the fact that the humidity of the outside air may be too high for its use directly, without cooling to remove some of the moisture. Sensors have been developed for giving an output which is affected by both temperature and relative humidity, that is, by the "enthalpy" of the air ambient to the sensor. One suitable sensor can be identified as the Honeywell model H205A Enthalpy Control.

BRIEF DESCRIPTION OF THE INVENTION

The present invention comprises an arrangement by which the cooler of an air conditioning system is disabled as long as the enthalpy of the outside air is such as to provide all the cooling needed to produce and maintain a desired system operation, and normal damper control is simultaneously overridden so that a maximum proportion of outside air is supplied to the fan for cooling the conditioned space. The cooler is automatically set into operation when the enthalpy of the outside air is not sufficient to give adequate cooling: special provision is also made to reestablish unmodified system operation if the enthalpy of the return air becomes too low, usually a matter of falling temperature.

A controller is provided which has "DAY" and "NIGHT" cycles and "SUMMER" and "WINTER" operational modes. It includes an enthalpy control at the outside air inlet and a second sensor at the return air inlet which may also be an enthalpy control; it also disables the cooler and overrides normal damper control when the desired space temperature can be obtained using outside air for cooling, provides automatic limitation of system operation to hours when the building is occupied, provides automatic, timed space cooldown at night if conditions are at acceptable levels, and provides winter night reset control for heating.

Various advantages and features of novelty which characterize the invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there is illustrated and described a preferred embodiment of the invention.

BRIEF DESCRIPTION OF THE DRAWING

In the drawing, in which like reference numerals indicate corresponding parts throughout the several views.

DETAILED DESCRIPTION OF THE INVENTION

Figure 1:
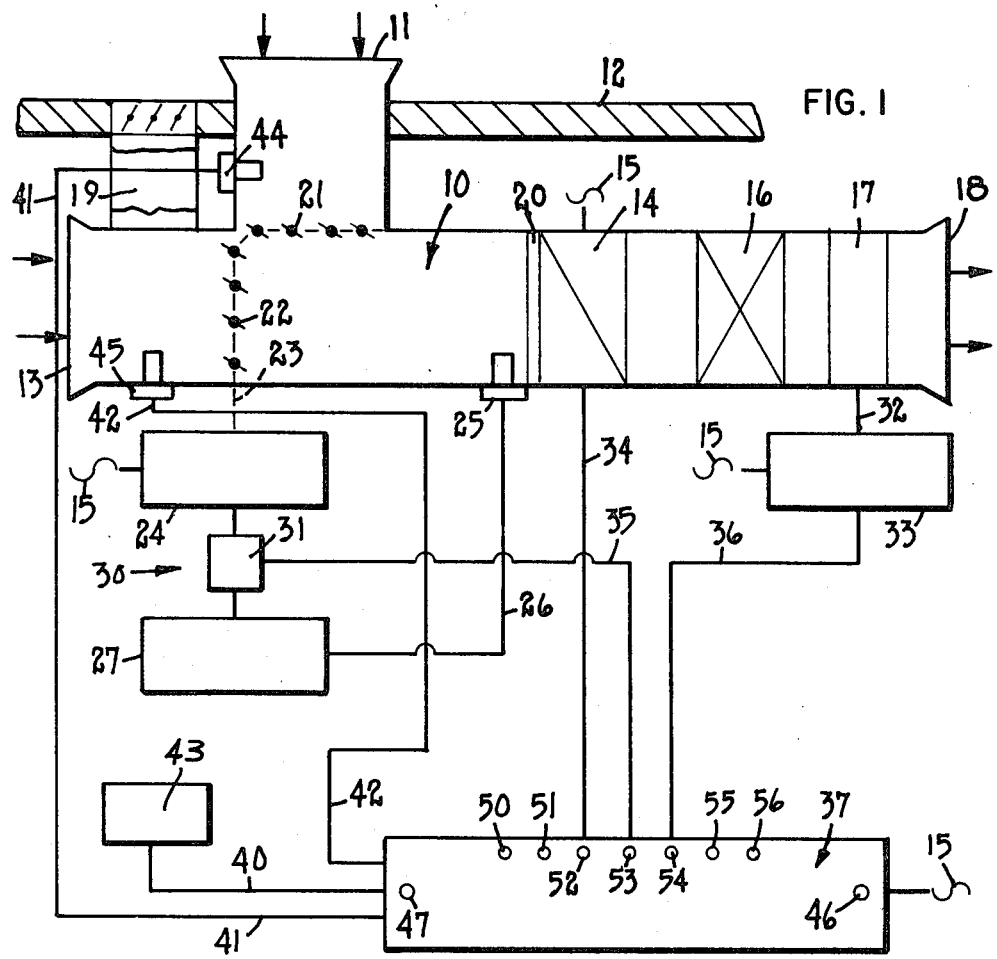
FIG. 1 is a block diagram of an arrangement by which the invention may be practiced.

Turning first to FIG. 1, there is shown a plenum 10 having a first inlet 11 for air drawn from outside the wall 12 of the space to be conditioned, a second inlet 13 for return air drawn from within the space, an air conditioner or cooler 14 for energization from a suitable source 15 of electrical energy, a heater 16, for cold season use, a fan 17 for drawing air from inlets 11 and 13 over cooler 14 and heater 16 and discharging the air into the space to be conditioned at an outlet 18, and a duct 19 venting the installation to the atmosphere. An air filter 20 is usually provided.

A set of dampers 21 and 22 in inlets 11 and 13 respectively are actuated through a mechanical connection 23 by a damper motor 24 connected to source 15, and operate so as to reversibly reduce the flow of air from one inlet while increasing it from the other, in accordance with the temperature of the mixed air in plenum 10 as sensed by a thermostat 25 having a connection 26 to a damper controller 27 which regulates motor 24 through a connection 30 including a junction box 31. In like fashion fan 17 is connected at 32 for energization through a starter 33 from source 15. Connections 34, 35 and 36 lead from cooler 14, junction box 31, and fan starter 33 to an enthalpy controller 37, energized from source 15, which has further connections 40, 41, and 42 from a plurality of sensors including a night thermostat 43 and further sensors 44 and 45 positioned to respond to the outside air and the return air respectively. Sensor 44 is an enthalpy control: sensor 45 may be another enthalpy control, but in many instances may be a simple thermostat, and in other instances may be a thermostat and a humidistat in series. Controller 37 has a power switch 46 with ON and OFF positions, and a season switch 47 with SUMMER and WINTER positions, and for convenience is provided with a plurality of signal lamps 50, 51, 52, 53, 54, 55, and 56, as will be described below.

Figure 2:
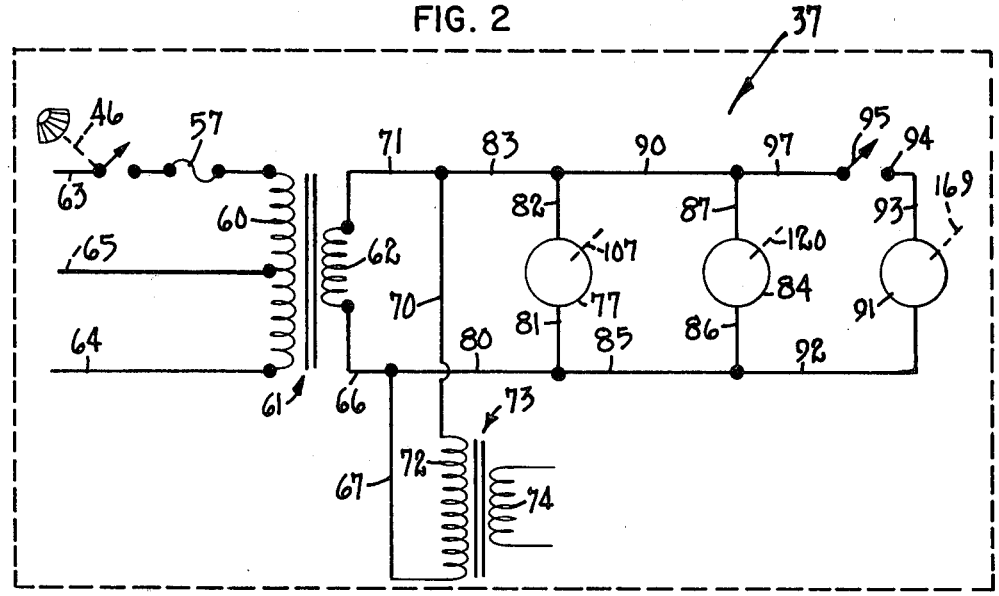
FIGS. 2, 3A and 3B are wiring diagrams giving details of the arrangement of FIG. 1.

FIG. 2 shows that switch 46 controls the supply of electrical energy through a fuse 57 to the primary winding 60 of a transformer 61 having a secondary winding 62. If the electrical energy is available at 220 volts, it is connected at conductors 63 and 64; if it is available at 110 volts, it is connected at conductors 63 and 65. Secondary winding 62 is connected by conductors 66, 67, and 70, 71 to the primary winding 72 of a step down transformer 73, the secondary winding 74 of which supplies control voltage for the supervisory circuits of controller 37.

A circuit for energizing a first timer 77 from secondary winding 62 may be traced in FIG. 2 through conductors 66, 80, and 81, the circuit being completed through conductors 82, 83, and 71.

A circuit for energizing a second timer 84 from secondary winding 62 may be traced through conductors 66, 80, 85, and 86, the circuit being completed through conductors 87, 90, 83, and 71.

Figure 3A:
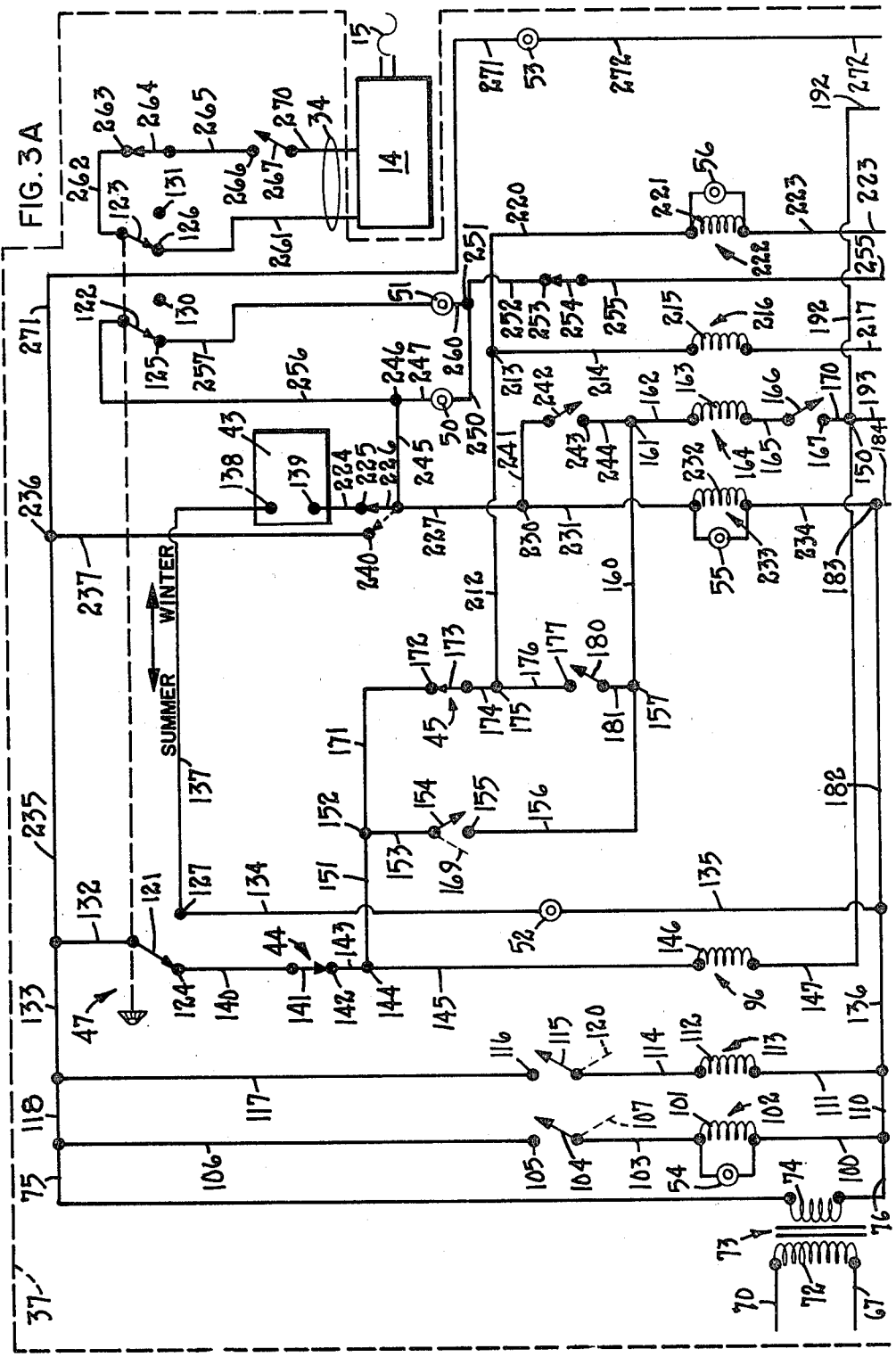
Figure 3B:
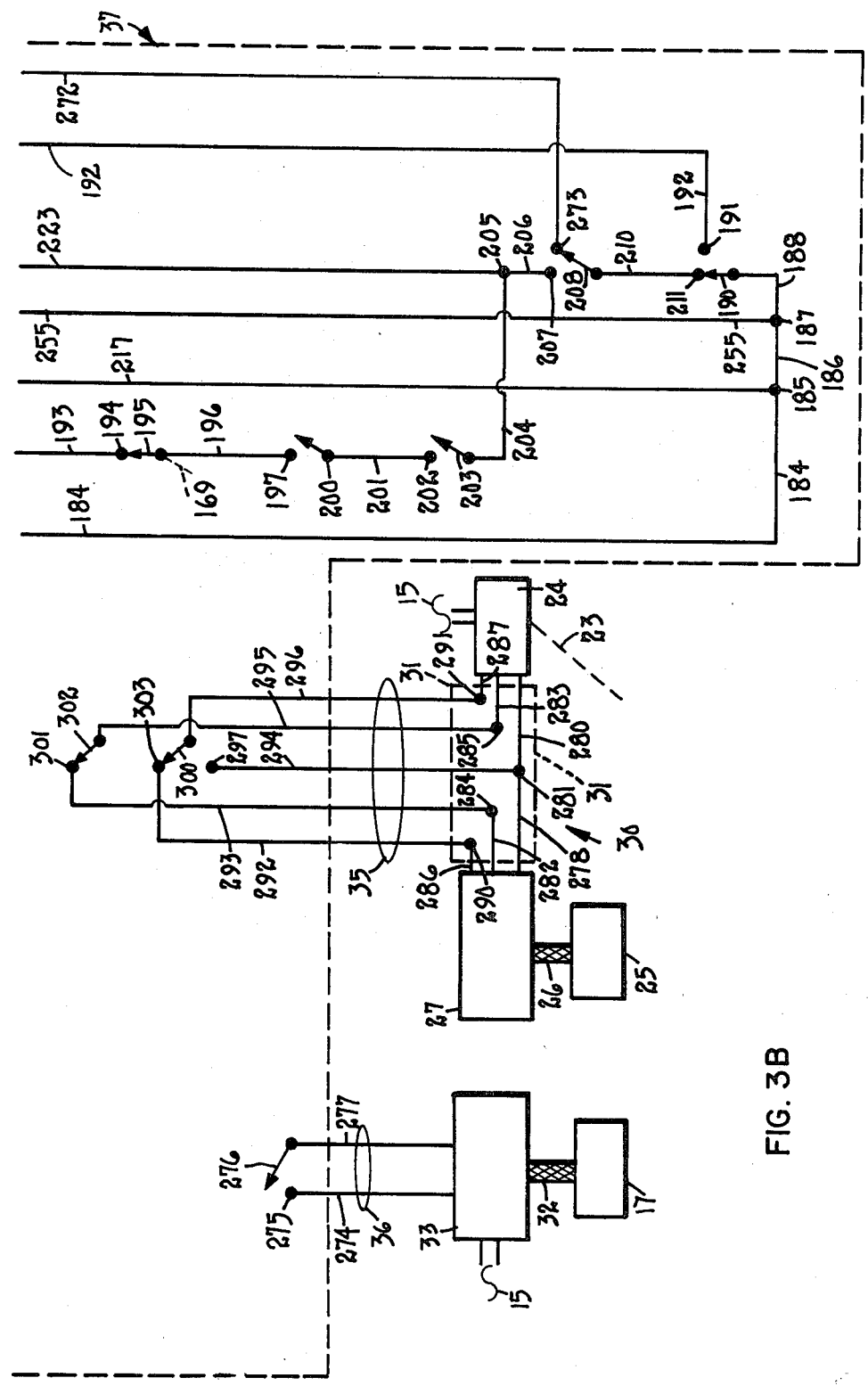

A circuit for energizing a third timer 91 may be traced from secondary winding 62 through conductors 66, 80, 85, and 92, the circuit being completed through conductor 93, normally open contacts 94 and 95 of a "PURGE" relay 96, shown in FIG. 3, and conductors 97, 90, 83, and 71.

Turning now to FIG. 3, a circuit may be traced from secondary winding 74 of transformer 73 through conductors 76 and 100 to the winding 101 of a "DAY-NIGHT" relay 102, the circuit being completed through conductor 103, contacts 104 and 105 of timer 77, and conductors 106 and 75. Contacts 104 and 105 are opened and closed by the shaft 107 of timer 77 in accordance with time of day. A "DAY" signal lamp 54 is connected in parallel with winding 101.

A circuit may be traced from secondary winding 74 through conductors 76, 110, and 111 to the winding 112 of a "COOL-DOWN" relay 113, the circuit being completed through conductor 114, the contacts 115 and 116 of timer 84, and conductors 117, 118, and 75. Contacts 115 and 116 are opened and closed by the shaft 120 of timer 84 in accordance with time of day.

Season switch 47 is shown to have a plurality of movable contacts 121, 122, and 123, which are unitarily movable between SUMMER positions, in which they engage fixed contacts 124, 125, and 126, and WINTER positions, in which they engage fixed contacts 127, 130, and 131. Movable contact 121 is connected through conductors 132, 133, and 118 to conductor 75. Fixed contact 127 is connected through conductor 134, a "HEAT" signal lamp 52, and conductors 135, 136, and 110 to conductor 76. Fixed contact 127 is also connected by conductor 137 to one terminal 138 of night thermostat 43.

Fixed contact 124 is connected through conductor 140, the contacts 141 and 142 of sensor 44, and conductor 143 to a junction point 144. Several circuits may be traced from junction point 144: a first such circuit may be traced through conductor 145, the winding 146 of PURGE relay 96, and conductor 147 to a junction point 150. A second circuit may be traced from junction point 144 through conductor 151, a junction point 152, conductor 153, contacts 154 and 155 of timer 91, conductor 156, a junction point 157, conductor 160, a junction point 161, and conductor 162 to the winding 163 of a "HOLD" relay 164, then through conductor 165, normally open contacts 166 and 167 of PURGE relay 96, and conductor 170 to junction point 150. Contacts 154 and 155 are normally open, but are closed for a settable period, when operation of timer 91 is initiated, by the shaft 169 of the timer.

A circuit may be traced from junction point 152 to junction point 157 through conductor 171, contacts 172 and 173 of sensor 45, conductor 174, a junction point 175, conductor 176, normally open contacts 177 and 180 of HOLD relay 164, and conductor 181.

A circuit may be traced from conductor 76 through conductors 110, 136, and 182, a junction point 183, conductor 184, a junction point 185, conductor 186, a junction point 187, conductor 188, normally open contacts 190 and 191 of COOL-DOWN relay 113, and conductor 192 to junction point 150.

A circuit may be traced from junction point 150 through conductor 193, normally closed contacts 194 and 195 of timer 91, conductor 196, normally open contacts 197 and 200 of HOLD relay 164, conductor 201, normally open contacts 202 and 203 of COOL-DOWN relay 113, conductor 204, junction point 205, conductor 206, normally open contacts 207 and 208 of DAY-NIGHT relay 102, conductor 210, normally closed contacts 211 and 190 of COOL-DOWN relay 113, and conductor 188 to junction point 187. Contacts 194 and 195 are normally closed, but are opened for a settable period when operation of timer 91 is initiated, by shaft 169.

A circuit may be traced from junction point 175 through conductor 212, a junction point 213, conductor 214 the winding 215 of a "DISABLE" relay 216, and conductor 217 to junction point 185.

A circuit may be traced from junction point 213 through conductor 220, the winding 221 of an "OVERRIDE" relay 222, and conductor 223 to junction point 205. An "OUTSIDE" signal lamp 56 is connected in parallel with winding 221.

A circuit may be traced from night thermostat terminal 139 through conductor 224, normally closed contacts 225 and 226 of DAY-NIGHT relay 102, conductor 227, junction point 230, conductor 231, the winding 232 of a "FAN" relay 233, and conductor 234 to junction point 183. A "FAN" signal lamp 55 is connected in parallel with relay winding 232.

A circuit may be traced from conductor 75 through conductors 118, 133, and 235, a junction point 236, conductor 237, normally open contacts 240 and 226 of DAY-NIGHT relay 102, and conductor 227 to junction point 230.

A circuit may be traced from junction point 230 through conductor 241, normally open contacts 242 and 243 of HOLD relay 164, and conductor 244 to junction point 161.

A circuit may be traced from relay contact 226 through conductor 245, a junction point 246, conductor 247, a "RETURN" signal lamp 50, conductor 250, a junction point 251, conductor 252, normally closed contacts 253 and 254 of DISABLE relay 216, and conductor 255 to junction point 187.

A circuit may be traced from junction point 246 through conductor 256, contacts 122 and 125 of switch 47, conductor 257, a "COOLER" lamp 51, and conductor 260 to junction point 251.

Connection 34 of FIG. 1 is shown in FIG. 3 to comprise a conductor 261, contacts 126 and 123 of switch 47, conductor 262, normally closed contacts 263 and 264 of DISABLE relay 216, conductor 265, normally open contacts 266 and 267 of DAY-NIGHT relay 102, and conductor 270. Cooler 14 operates on demand from its own control whenever the circuit just traced is complete.

A circuit may be traced from junction point 236 through conductor 271, a "NIGHT" signal lamp 53, conductor 272, normally closed contacts 273 and 208 of DAY-NIGHT relay 102, conductor 210, normally closed 211 and 190 of COOL-DOWN relay 113, and conductor 188 to junction point 187.

Connection 36 in FIG. 1 is shown in FIG. 3 to comprise conductor 274, normally open contacts 275 and 276 of FAN relay 233, and conductor 277.

Connection 30 of FIG. 1 is shown to comprise conductors 278 and 280 and junction point 281, conductors 282 and 283 and junction points 284 and 285, and conductors 286 and 287 and junction points 290 and 291.

Connection 35 of FIG. 1 is shown in FIG. 3 to include conductors 292, 293, 294, 295, and 296 and an contacts 297 and 300, normally open, contacts 301 and 302, normally closed, and contacts 303 and 300, normally closed, of OVERRIDE relay 222. Conductors 278 and 280 are always connected at junction point 281. A normally closed circuit may be traced from conductor 282 through junction point 284, conductor 293, relay contacts 301 and 302, conductor 295, and junction point 285 to conductor 283, and another from conductor 286 through junction point 290, conductor 292, relay contacts 303 and 300, conductor 296, and junction point 291 to conductor 287. An alternate circuit can be traced from junction point 281 through conductor 294, relay contacts 297 and 300, conductor 296, and junction point 291 to conductor 287.

When conductor 278 is connected to conductor 286, in controller 27, motor 24 runs in a direction to adjust the damper so as to maximize the ratio of outside air to return air, that is, to open damper 21 and close damper 22. When conductor 278 is connected to conductor 282 in controller 27, motor 24 runs in the opposite direction, to minimize the ratio of outside air to return air.

Connection 40 in FIG. 1 comprises conductors 137 and 224 in FIG. 3, connection 41 in FIG. 1 comprises conductors 140 and 143 in FIG. 3, and connection 42 in FIG. 1 comprises conductors 171 and 174 in FIG. 3.

In FIGS. 2 and 3 the relay contacts are shown in the conditions they assume when the windings are deenergized. Power switch 46 is shown OFF. Season switch 47 is shown in SUMMER position, in which night thermostat 43 is disabled. The timer contacts are shown in the OFF positions of the timers. No details are given of the heat control components, since the invention does not affect them. Electrical energy is available from source 15 for enthalpy controller 37, fan starter 33, damper motor 24, and cooler 14.

OPERATION

Operation of the system will be described for the conditions under which it is intended to function most effectively. The energy conservation of this invention during the summer or air conditioning season is accomplished first by turning off the fan and cooler when the building is not occupied and second by disabling the cooler and using outside air as a coolant when the enthalpy of the outside air is sufficiently low to enable its use for this purpose.

By way of illustration, consider the case of a space such as an office building which is to occupied from 9 a.m. to 5 p.m., and which should be air conditioned during these hours. The space itself acts as a heat sink, and will remain usably cool until 5 p.m. if the equipment is turned off at 4:30. During unoccupied hours the temperature in the space slowly rises and then levels off as the ambient temperature drops, so that the equipment must be started in the morning early enough to produce the desired space conditions by 9 a.m. In this situation timer 77 may be set to close contacts 104 and 105 from 8 a.m. to 4:30 p.m.

It is known that the outside air normally reaches its lowest temperature about 5 a.m., so that if the temperature at 5 a.m. is not sufficiently low, the installation must rely on use of cooler 14 for reducing the space temperature. If the outside air temperature at 5 a.m. is low enough, and its relative humidity is not too high, the building should be cooled at this time to make most efficient use of the heat differential: once an unoccupied building is cooled at this time of day and under these conditions, system operation can be interrupted for an hour or so without difficulty. Timer 84 may thus be set to close contacts 115 and 116 at 5 a.m. and open them again at 6 a.m.

Sensor 45 and thermostat 25 are located at plenum 10, and when the system is not in operation no air flows past these sensors. This means that the sensor responses are without any meaningful relation to the system needs, but are in large part determined by the atmospheric ambience of the sensor locations. Accordingly it is necessary to "purge" the system, that is, to cause sufficient air flow to ensure that the sensor responses are in fact representative of actual temperature conditions in the space before proper operation can be accomplished. A relatively short interval of fan operation is all that is required here, and timer 91 may be set to close contacts 154 and 155, and open contacts 194 and 195, for two minutes when the timer is energized.

Sensor 44 is set to close contacts 141 and 142 when the temperature and relative humidity of the outside air are below 75° F. and 50% respectively. Sensor 45, if an enthalpy control, is set to open contacts 172 and 173 when the temperature and relative humidity of the return air are below 70° F. and 50% respectively. Thermostat 25 is set to close when the temperature of the mixed air in plenum 10 ahead of cooler 14 is above a value determined pragmatically by observing operation of the system, which value may, for example, be 75° F.

The system is put into operation by closing power switch 46. For convenience of description let it be assumed that this is done at midnight, and that timers 77 and 84 have accordingly been set to midnight. Contacts 104 and 105 of timer 77 and contacts 115 and 116 of timer 84 are open. Contacts 194 and 195 of timer 91 are closed, while its contacts 154 and 155 are open.

Normal midnight conditions are such that when the system is turned on the outside enthalpy is high so that contacts 141 and 142 of sensor 44 are open, and that the air enthalpy of sensor 45 is such that contacts 173 and 172 are closed, as is shown in FIG. 3.

Closure of switch 46 energizes transformers 61 and 73 and starts operation of timers 77 and 84, FIG. 2, but no relay energization in FIG. 3 takes place. Cooler 14 is disabled at contacts 266 and 267 of DAY-NIGHT relay 102. Fan starter 33 is disabled at contacts 275 and 276 of FAN relay 233. Operation of dampers 21 and 22 by motor 24 is under the control of thermostat 25 without interference from enthalpy controller 37, and under normal conditions damper 22 is closed and damper 21 is open. All signal lamps are de-energized except NIGHT lamp 53, which is energized from secondary winding 74, now energized, through conductors 75, 118, 133, 235, and 271, the lamp, conductor 272, contacts 273 and 208 of DAY-NIGHT relay 102, conductor 210, contacts 211 and 190 of COOL-DOWN relay 113, and conductors 188, 186, 184, 182, 136, 110 and 76.

As time passes, the outdoor enthalpy decreases to a point where contacts 141 and 142 of sensor 44 close, and a circuit to DISABLE relay 216 is completed from secondary winding 74 through conductors 75, 118, 133, and 132, contacts 121 and 124 of switch 47, conductor 140, contacts 141 and 142 of sensor 44, conductors 143, 151, and 171, contacts 172 and 173 of sensor 45, conductors 174, 212, and 214, relay winding 215, and conductors 217, 184, 182, 136, 110, and 76.

Operation of DISABLE relay 216 opens contacts 253 and 254 to prevent energization of RETURN lamp 50 and COOLER lamp 51, and also opens contacts 263 and 264, to prevent energization of cooler 14 under the enthalpy conditions described.

When the time reaches 5 a.m., timer 84 closes contacts 115 and 116, energizing COOL-DOWN relay 113 from secondary winding 74 through conductors 75, 118, and 117, contacts 116 and 115, conductor 114, winding 112, and conductors 111, 110, and 76. Operation of relay 113 closes contacts 202 and 203 as a preparatory function, opens contacts 211 and 190 to extinguish NIGHT lamp 53, and closes contacts 191 and 190, this latter action completing a circuit for PURGE relay 96 from secondary winding 74 through conductors 75, 118, 133, and 132, contacts 121 and 124 of switch 47, conductor 140, contacts 141 and 142 of sensor 44, conductors 143 and 145, relay winding 146, conductors 147 and 192, relay contacts 191 and 190, and conductors 188, 186, 184, 182, 136, 110, and 76.

Operation of PURGE relay 96 closes contacts 166 and 167 as a preparatory function, and closes contacts 95 and 94 (FIG. 2) to energize timer 91, which opens contacts 194 and 195 as a preparatory function and closes contacts 154 and 155. A circuit for HOLD relay 164 is now completed from secondary winding 74 through conductors 75, 118, 133, and 132, contacts 121 and 124 of switch 47, conductor 140, contacts 141 and 142 of sensor 44, conductors 151 and 153, timer contacts 154 and 155, conductors 156, 160, and 162, relay winding 163, conductor 165, relay contacts 166 and 167, conductors 170 and 192, relay contacts 191 and 190, and conductors 188, 186, 184, 182, 136, 110, and 77. Note that this energization of HOLD relay 164 takes place if contacts 141 and 142 of sensor 44 are closed, whether or not contacts 172 and 173 of sensor 45 are closed.

Operation of HOLD relay 164 closes contacts 177 and 180, to complete a holding circuit between junction points 152 and 157, if sensor contacts 172 and 173 are closed, and closes contacts 197 and 200 as a preparatory function.

Operation of HOLD relay 164 also closes contacts 242 and 243, completing a circuit for FAN relay 233 and FAN lamp 55 from secondary winding 74 through conductors 75, 118, 133, and 132, contacts 121 and 124 of switch 47, conductor 140, contacts 141 and 142 of sensor 44, conductors 143 and 151 to junction point 152, then to junction point 157 by conductor 153, timer contacts 154 and 155, and conductor 156 or by conductor 171, contacts 172 and 173 of sensor 45, conductors 174 and 176, relay contacts 177 and 180, and conductor 181, then through conductors 160 and 244, relay contacts 243 and 242, conductors 241 and 231, relay winding 232 and lamp 55, and conductors 234, 182, 136, 110, and 76. FAN relay contacts 275 and 276 close to cause operation of fan 17.

After operating for a period of two minutes, timer 91 opens contacts 154 and 155 and closes contacts 194 and 195. HOLD relay 164 is retained energized, if the indoor enthalpy is high, by a holding circuit from junction point 152 through conductor 171, contacts 172 and 173 of sensor 45, conductors 174 and 176, relay contacts 177 and 180, and conductor 181 to junction point 157, so that fan operation is continued by FAN relay 233.

A circuit may now be traced to relay 222 from transformer 74 through conductors 75, 118, 133, and 132, switch contacts 121 and 124, conductor 140, contacts 141 and 142 of sensor 44, conductors 143, 151, and 171, contacts 172 and 173 of sensor 45, conductors 174, 212, and 220, relay winding 221 and lamp 56, conductors 223 and 204, relay contacts 203 and 202, conductor 201, relay contacts 200 and 197, conductor 196, relay contacts 195 and 194, conductors 193 and 192, relay contacts 191 and 190, and conductors 188, 186, 184, 182, 136, 110, and 76. Relay contacts 300 and 302 are actuated to remove damper motor 24 from the control of thermostat 25 and controller 27 and cause it to drive to the position in which damper 22 is closed and damper 21 is open, giving maximum outside air for cooling.

When the time reaches 6 a.m., timer 84 opens contacts 115 and 116, de-energizing COOL-DOWN relay 113, which opens contacts 191 and 190 and closes contacts 190 and 211, and opens contacts 202 and 203. These operations restore the circuit for NIGHT lamp 53 and open the circuits for OVERRIDE relay 222, PURGE relay 96 and HOLD relay 164. OVERRIDE relay 222 repositions contacts 300 and 302 to restore control of the dampers to thermostat 25 and controller 27. PURGE relay 96 opens contacts 166 and 167, and opens contacts 94 and 95 of FIG. 2. HOLD relay 164 opens contacts 177 and 180, contacts 197 and 200, and contacts 242 and 243, the latter de-energizing FAN relay 233 so that contacts 275 and 276 open and fan operation ceases: FAN lamp 55 is extinguished. DISABLE relay 216 remains energized unless sensor 44 or sensor 45 opens its contacts.

No change in the system occurs from 6 a.m. to 8 a.m., when timer 77 closes contacts 104 and 105, energizing DAY-NIGHT relay 102 and DAY lamp 54 from secondary winding 74 through conductors 75 and 106, contacts 105 and 104, conductor 103, relay winding 101 and lamp 54, and conductors 100 and 76.

Operation of relay 102 closes contacts 266 and 267. Circuit 34 is open, however, at contacts 263 and 264 of DISABLE relay 216, and operation of cooler 14 does not take place.

Operation of DAY-NIGHT relay 102 opens contacts 208 and 273, disabling NIGHT lamp 53, and closes contacts 208 and 207, energizing OVERRIDE relay 222 and OUTSIDE lamp 56 from secondary winding 74 through conductors 75, 118, 133, and 132, contacts 121 and 124 of switch 47, conductor 140, contacts 141 and 142 of sensor 44, conductors 143, 151, and 171, contacts 172 and 173 of sensor 45, conductors 174, 212, and 220, relay winding 221 and lamp 56, conductors 223 and 206, relay contacts 207 and 208, conductor 210, relay contacts 211 and 190, and conductors 188, 186, 184, 182, 136, 110, and 76. Relay contacts 300 and 302 again remove damper motor 24 from the control of thermostat 25 and controller 27, and cause it to drive to the position in which dampers 22 are closed and dampers 21 are open, giving maximum outside air for cooling.

Operation of DAY-NIGHT relay 102 also opens contacts 226 and 225, disabling night thermostat 43, and closes contacts 226 and 240, energizing FAN relay 233 and FAN lamp 55 from secondary winding 74 through conductors 75, 118, 133, 235, and 237, relay contacts 240 and 226, conductors 227 and 231, relay winding 232 and lamp 55, and conductors 234, 182, 136, 110, and 76. Relay contacts 275 and 276 close to cause operation of fan 17.

Operation of the system is thus established, and continues, fan 17 drawing maximum outside air and cooler 14 being disabled, as long as the enthalpy conditions are favorable for this operation. If the enthalpy of the return air should decrease unduly, contacts 172 and 173 of sensor 45 open, de-energizing OVERRIDE relay 222 so that control of the dampers is restored to thermostat 25, and de-energizing DISABLE relay 216 so that cooler 14 and lamps 50 and 51 may operate if needed.

When the outside air enthalpy increases to a point where the air cannot be used for cooling, contacts 141 and 142 of sensor 44 open, deenergizing DISABLE relay 216 and OVERRIDE relay 222. The former relay closes contacts 263 and 264 to enable operation of cooler 14 under its own controls, and closes contacts 253 and 254 to complete a circuit for RETURN lamp 50 from transformer 74 through conductors 75, 118, 133, 235, and 237, relay contacts 240 and 226, conductors 245 and 247, the lamp, conductors 250 and 252, relay contacts 255 and 254, and conductors 255, 186, 184, 182, 136, 110, and 76, and to complete a circuit for COOLER lamp 151 in parallel with lamp 151 from junction point 246 through conductor 256, switch contacts 122 and 125, conductor 257, the lamp, and conductor 260 to junction point 251. Relay 222 acts through contacts 300 and 302 to restore the damper control to thermostat 25. Operation of the equipment is now unmodified by the enthalpy control system.

When the time reaches 4:30 p.m., timer 77 opens contacts 104 and 105, de-energizing DAY-NIGHT relay 102 and DAY lamp 154. Relay contacts 240 and 226 open, to de-energize FAN relay 233 and FAN lamp 55, fan operation being interrupted at relay contacts 275 and 276, and to disable lamps 50 and 51, and relay contacts 225 and 226 close as a preparatory function. Relay contacts 266 and 267 open to disable cooler 14. Relay contacts 207 and 208 open, and relay contacts 208 and 273 close to energize NIGHT lamp 53. The system remains in this state until time again reaches 5 a.m., when the cycle is repeated.

Certain refinements of the system should now be pointed out. If during the cooldown function from 5 to 6 a.m. the outside air is so cool that the enthalpy of the return air is rendered unduly low, sensor contacts 172 and 173 open, although sensor contacts 141 and 42 are still closed. This de-energizes or prevents the energization of OVERRIDE relay 222 and DISABLE relay 216, so that damper control is restored to thermostat 25 and cooler 14 can be set in operation when DAY-NIGHT relay 102 is operated at 8 a.m.

If the outside air enthalpy is too high at 5 a.m., contacts 141 and 142 of sensor 44 remain open and no operation of PURGE relay 96, FAN relay 233, HOLD relay 164, DISABLE relay 216, or OVERRIDE relay 222 takes place, timer 191 does not operate, and no purge or cooldown functions occur. At 8 a.m. DAY-NIGHT relay 102 starts fan 17 and cooler 14 and the installation operates unmodified by the enthalpy control system.

If during the cooldown function the enthalpy of the return air becomes too low, contacts 172 and 173 of sensor 45 open, causing de-energization of HOLD relay 164: contacts 243 and 244 of that relay open to de-energize the winding of FAN relay 233, so that fan operation ceases until reactivated at 8 a.m. by DAY-NIGHT relay 102. DISABLE relay 216 and OVERRIDE relay 222 are deenergized at the same time, so as to enable unmodified operation of the system.

If season switch 47 is thrown to its WINTER position, the midnight conditions are as follows. NIGHT lamp 53 is energized as before. Sensors 44 and 45, timer 91, PURGE relay 96, HOLD relay 164, DISABLE relay 216, OVERRIDE relay 222, and OUTSIDE lamp 56 are disabled at switch contacts 121 and 124, COOLER lamp 51 is de-energized at switch contacts 122 and 125, cooler 14 is de-energized at switch contacts 123 and 126, and switch contacts 121 and 127 close to energize HEAT lamp 52 from secondary winding 74 through conductors 75, 118, 133, and 132, contacts 121 and 127 of switch 47, conductor 134, lamp 52, and conductors 135, 136, 110, and 76, and to complete a preparatory connection for night thermostat 43. Now when night thermostat 43 closes, a circcuit is completed for FAN relay 233 and FAN lamp 55 from secondary winding 74 through conductors 75, 118, 133, and 132, contacts 121 and 127 of switch 47, conductor 137, thermostat 43, conductor 224, relay contacts 225 and 226, conductors 227 and 231, relay winding 232 and lamp 55, and conductors 234, 182, 136, 110, and 76: the circuit is branched at relay contact 226 to include conductors 245 and 247, RETURN lamp 50, conductors 250 and 252, relay contacts 253 and 254, and conductors 255, 186, 184, 182, 136, 110, and 76. Energization of FAN relay 233 causes operation of fan 17 as before, so that operation of the fan is under control of night thermostat 43, lamps 55 and 50 going on and off with the fan: dampers 21 and 22 are controlled by thermostat 25.

Timer 84 closes contacts 115 and 116 from 5 a.m. to 6 a.m., but this does no more than de-energize NIGHT lamp 53 while the timer contacts are operated. Timer 91 is not energized, and sensors 44 and 45 are ineffective.

Timer 77 closes its contacts 105 and 104 at 8 a.m., energizing DAY-NIGHT relay 102 and DAY lamp 54 as before. Relay contacts 225 and 226 open and contacts 240 and 226 close, to interrupt control of FAN relay 233, FAN lamp 55, and RETURN lamp 50 from night thermostat 43 and energize them continuously. Relay contacts 266 and 267 open to disable cooler 14, and relay contacts 208 and 273 open to disable NIGHT lamp 53.

Finally, throwing power switch 46 to its OFF position de-energizes the entire system.

It has been previously assumed that sensor 45 is an enthalpy sensor, but in many instances this complexity is not needed. In most cases the sensible heat generated in a building is the dry type, from lights, machines, and insulation. This means that as the temperature of the space rises its relative humidity goes down. When outside air is used for cooling, the space relative humidity is lower than the outside relative humidity. If an enthalpy control 45 is set for an appropriate temperature lower than that for control 44, the relative humidity of the return air never approaches a value which would actuate sensor 45, and its function can be accomplished by a simple thermostat.

On the other hand, if the system is to be used in a space where the sensible heat generated includes increased moisture, as in laundries or bakeries, for example, the function of the relative humidity detector may be necessary, and an enthalpy control, or a thermostat and humidostat in series, should be supplied.

Numerous characteristics and advantages of the invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

What is claimed is:

1. Apparatus for conditioning the air in a space comprising, in combination:
   a plenum;
   means admitting to the plenum return air from within the space;
   means admitting to the plenum air from outside the space;
   a cooler;
   a fan for drawing air from said plenum over said cooler and discharging it into said space;
   means for varying the ratio between the quantities of outside air and return air admitted to said plenum in accordance with the temperature of the air in said plenum;
   means responsive to the enthalpy of the air outside said space;
   and means disabling said cooler and maximizing said ratio when said enthalpy has less than a predetermined value.

2. Apparatus for conditioning the air in a space comprising, in combination:
   a plenum;
   means admitting to the plenum return air from within the space;
   means admitting to the plenum air from outside the space;
   a cooler;
   a fan for drawing air from said plenum over said cooler and discharging it into said space;
   means for varying the ratio of the quantities of outside and return air admitted to said plenum in accordance with the temperature of the air in said plenum;
   means responsive to the enthalpy of the air outside said space;
   timer means disabling and reenabling said cooler and said fan at selected intervals;
   and means preventing reenablement of said cooler, and maximizing said ratio, when said enthalpy has less than a predetermined value.

3. Apparatus for conditioning the air in a space comprising, in combination:
   a plenum;
   first inlet means admitting to the plenum return air from within the space;
   second inlet means admitting to the plenum air from outside the space;
   a cooler;
   a fan for drawing air from said inlet means into said plenum and over said cooler and discharging it into said space;
   damper means actuable between first and second positions in which the ratio of outside air to return air is respectively maximized and minimized;
   control means responsive to the temperature of the air in said plenum for actuating said damper means;
   and means responsive to the enthalpy of said outside air for disabling said cooler and overriding said control means to actuate said damper means into said first position.

* * * * *